United States Patent
Zhao et al.

(10) Patent No.: US 9,665,152 B1
(45) Date of Patent: May 30, 2017

(54) RFID-BASED POWER STATUS AND BATTERY MANAGEMENT

(71) Applicant: Motorola Mobility LLC, Chicago, IL (US)

(72) Inventors: Hong Zhao, Naperville, IL (US); Scott Debates, Crystal Lake, IL (US); Shu Fong Tsau, Palatine, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 15/013,042

(22) Filed: Feb. 2, 2016

(51) Int. Cl.
*G06F 1/28* (2006.01)
*G06K 7/10* (2006.01)

(52) U.S. Cl.
CPC ........... *G06F 1/28* (2013.01); *G06K 7/10366* (2013.01)

(58) Field of Classification Search
CPC ............................... G06F 1/28; G06K 7/10366
See application file for complete search history.

(56) References Cited

U.S. PATENT DOCUMENTS

| | | | | |
|---|---|---|---|---|
| 7,495,558 B2* | 2/2009 | Pope | ...................... | G01K 1/024 235/385 |
| 7,564,354 B2* | 7/2009 | Eren | ................ | G06K 19/07749 340/568.1 |
| 7,849,107 B2* | 12/2010 | Schuessler | ........... | G06K 7/0008 707/803 |
| 7,956,747 B2* | 6/2011 | Boss | ....................... | H04L 12/10 340/572.1 |
| 7,994,924 B2* | 8/2011 | Brandt | ................... | H01H 9/168 340/572.1 |
| 8,154,390 B2* | 4/2012 | Heath | ..................... | A61J 1/035 340/309.16 |
| 8,400,297 B2* | 3/2013 | Tuttle | ................... | G06K 7/0008 340/10.33 |
| 2002/0067267 A1* | 6/2002 | Kirkham | .............. | B65D 5/4233 340/572.7 |
| 2016/0307007 A1* | 10/2016 | Narasimha | ............ | H04W 4/008 |

* cited by examiner

*Primary Examiner* — Mark Connolly

(57) ABSTRACT

In embodiments of RFID-based power status and battery management, a mobile device includes a radio-frequency identification (RFID) tag that includes a memory to maintain context information associated with the mobile device. The mobile device includes a processing system to execute a power manager and to interface with the RFID tag via a communication bus. The power manager can determine a stowed context of the mobile device based on one or more sensors implemented in the mobile device, and communicate a stowed context indication of the stowed context of the mobile device to the RFID tag to be stored in the RFID tag memory. The power manager can also communicate a power-state indicator of a power on state or a power off state of the mobile device to the RFID tag to be stored in the RFID tag memory.

20 Claims, 5 Drawing Sheets

RFID-BASED POWER STATUS AND BATTERY MANAGEMENT

BACKGROUND

Portable devices, such as mobile phones, tablet devices, digital cameras, and other types of computing and electronic devices are manufactured and then packaged for shipment and retail sales. Typically, the devices are packaged with a charged battery and powered off so that when a device is purchased and the package opened, the device is ready for use. However, some of the devices can be inadvertently powered on while being packaged if the power key is depressed, which unnecessarily drains the battery power while the device is stowed in the retail packaging and shipped. Consequently, a device that has been inadvertently powered on may ship to a customer and arrive with a drained battery (e.g., a low or dead battery), causing an unfavorable user experience and customer dissatisfaction when having to first charge the battery before using the new device. Similarly, a user may pack a battery-powered portable device, such as a tablet device or laptop computer, in luggage for a trip, only to find out at the destination that the battery has been drained because the device was left powered on or inadvertently powered-up while packing the device.

BRIEF DESCRIPTION OF THE DRAWINGS

Embodiments of RFID-based power status and battery management are described with reference to the following Figures. The same numbers may be used throughout to reference like features and components that are shown in the Figures.

DETAILED DESCRIPTION

Figure 1:
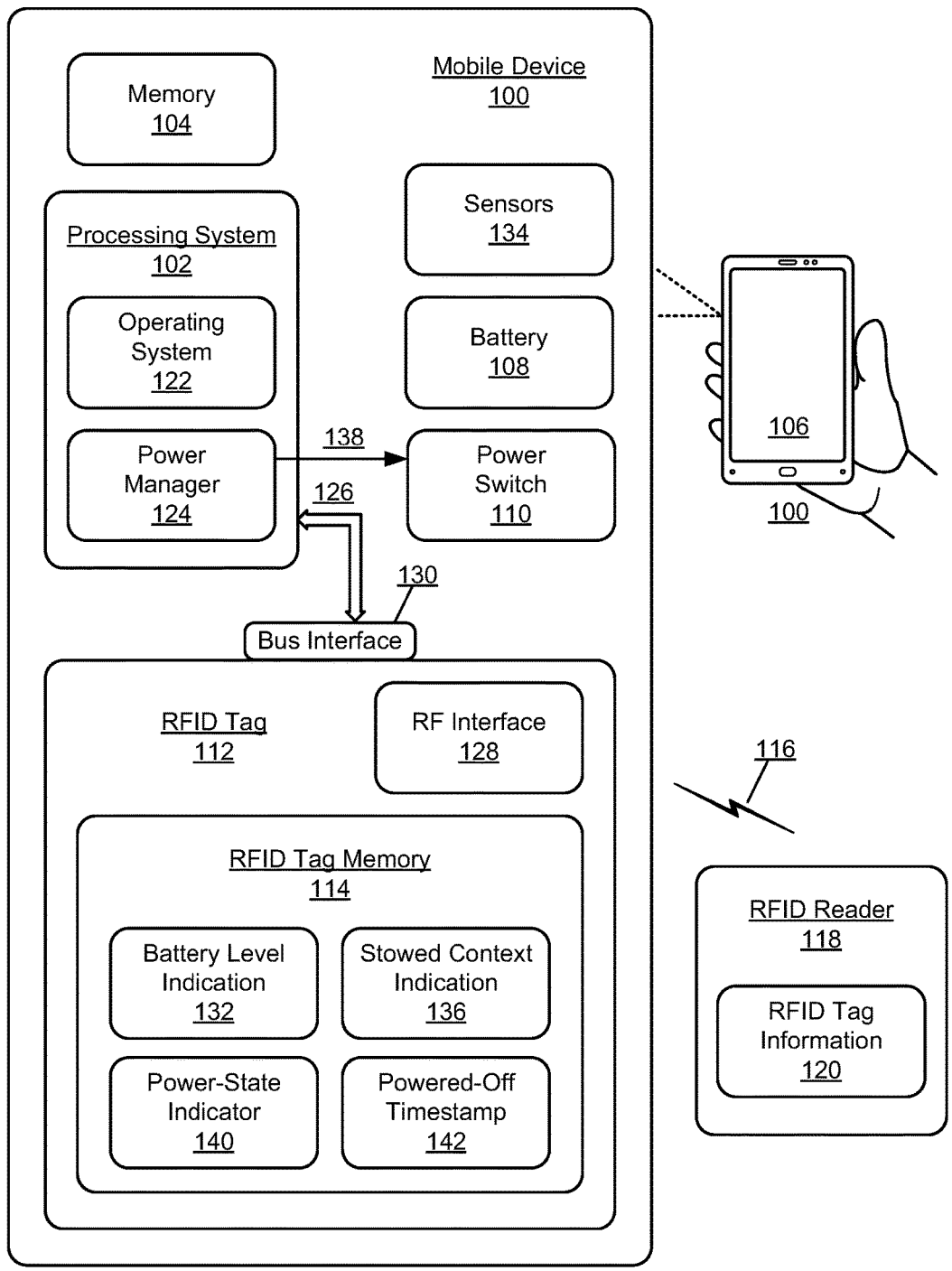
FIG. 1 illustrates an example mobile device in which embodiments of RFID-based power status and battery management can be implemented.

Embodiments of RFID-based power status and battery management are described, such as for any type of mobile device that may be implemented with a radio-frequency identification (RFID) tag that can be utilized to determine whether the device has been stowed in retail packaging for shipment and consumer purchase, and was inadvertently powered on while being packaged. Further, while a mobile device is still packaged, the RFID tag can be utilized to determine whether the battery level of the battery in the device has been depleted to a level that requires re-charging prior to being shipped to a consumer. Additionally, the RFID tag in the mobile device can be utilized to determine that the device is powered on and stowed, and that the battery level of the battery in the device is at least at a designated level or higher. In this case, the RFID tag can also be utilized to toggle an output signal line that is connected to a power switch of the device and remotely power-down (e.g., turn-off) the device while stowed and still in the packaging.

In aspects of RFID-based power status and battery management, a mobile device includes a radio-frequency identification (RFID) tag to maintain a power-state indicator of whether the mobile device is in a powered on state or in a powered off state. In an embodiment, the antenna of the RFID tag in the mobile device remains activated, regardless of whether the device is powered on or powered off. A stowed context of the mobile device can be determined based on sensors in the mobile device when the device is stowed in retail or shipping packaging, or for travel by a user of the device. When a power-down process of the mobile device is initiated, a power manager can determine a battery level of the battery in the device, and store an indication of the battery level in a RFID tag memory of the RFID tag in the mobile device. Additionally, a powered-off timestamp that indicates when the mobile device is powered-down can be stored in the RFID tag memory of the RFID tag in the device.

In additional aspects of RFID-based power status and battery management, The RFID tag in the mobile device can receive an interrogation from an external RFID reader that receives a response of the power-state indicator, which indicates a power on state or a power off state of the mobile device. If a determination is made that the mobile device is powered off, the RFID reader can also receive the powered-off timestamp that indicates when the mobile device was last powered-down. However, if the determination is that the mobile device is powered on, then the RFID reader can also receive the stowed context indication of whether the mobile device is stowed in the retail or shipping packaging, or for travel. If the mobile device is stowed, then the RFID reader can also receive a battery level indication of the battery of the mobile device and determine whether the battery level is at least at a designated level, such as would be acceptable to ship the mobile device as a new consumer product so that the purchaser receives the device with a charged battery. If the mobile device is stowed for shipping or travel, yet is powered on (e.g., likely inadvertently while being packaged), then the RFID reader can initiate a command to the RFID tag in the mobile device to toggle an output signal line to remotely power-down the mobile device.

In an alternate embodiment, the antenna of the RFID tag in the mobile device is enabled when the mobile device is powered-down, and the antenna of the RFID tag is disabled when the mobile device is powered-up. The RFID tag can receive an interrogation from an external RFID reader and, if the antenna of the RFID tag in the mobile device is enabled, transmit the power-state indicator of the mobile device to the RFID reader responsive to the interrogation from the RFID reader. A determination can then be made that the mobile device is powered on based on the RFID tag not responding to the interrogation from the RFID reader because the antenna of the RFID tag is disabled, or that the mobile device is powered off based on the RFID tag responding to the interrogation from the RFID reader because the antenna of the RFID tag is enabled.

As used herein, the term "powered on" indicates that a device is on and in an operational state, and the term "powered off" indicates that the device is off. The term "powered-up" is used to indicate that a device is in the process of turning-on, such as when a user of the device presses the power switch to turn the device on, or when the power switch is toggled to turn the device on. After the device has "powered-up" from the "powered off" state, the device is then in the "powered on" state. The term "powered-down" is used to indicate that a device is in the process of turning-off, such as when the user of the device presses the power switch to turn the device off, or when the power switch is toggled to turn the device off After the device has "powered-down" from the "powered on" state, the device is then in the "powered off" state.

While features and concepts of RFID-based power status and battery management can be implemented in any number of different devices, systems, environments, and/or configurations, embodiments of RFID-based power status and battery management are described in the context of the following example devices, systems, and methods.

FIG. 1 illustrates an example mobile device 100 in which embodiments of RFID-based power status and battery management can be implemented. The example mobile device 100 may be any type of mobile phone, tablet device, digital camera, or other types of computing and electronic devices that are typically battery powered. The mobile device 100 can be implemented with various components, such as a processing system 102 (e.g., one or more processors), a memory 104, an integrated display device 106, and any number and combination of various components as further described with reference to the example device shown in FIG. 5. Additionally, the mobile device 100 includes a power source, such as a battery 108, to power the various device components. The mobile device 100 also includes a power switch 110 that can be toggled to power-up or power-down the mobile device. Further, the mobile device 100 can include the different wireless radio systems, such as for Wi-Fi, Bluetooth™, Mobile Broadband, LTE, Near Field Communication (NFC), or any other wireless communication system or format for communication via respective wireless networks.

In this example, the mobile device 100 implements components and features of a radio-frequency identification (RFID) tag 112 that is implemented to store, in memory 114 of the RFID tag, a power status, battery-related data, and other context information associated with the mobile device 100. Alternatively, any suitable non-volatile memory (e.g., the device memory 104) can be used to store the data and information that is associated with the mobile device 100 separate from the RFID tag 112. The RFID tag 112 is also implemented for two-way wireless communication 116 with RFID readers, such as a RFID reader 118 (also referred to as a RFID interrogator) that interrogates the RFID tag 112 for the data and information stored in the RFID tag memory 114. Generally, RFID tags are small electronic tags or labels that can be programmed with data and other information. The RFID reader 118 can transmit an interrogation signal as a broadcast message requesting RFID tags that are in range to return the data and information that the RFID tags have stored. The RFID tags can then wirelessly communicate the data and information to the RFID reader via a radio frequency (RF) communication channel, which the RFID reader 118 receives as the RFID tag information 120.

In implementations, a RFID tag (e.g., the RFID tag 112) can include an ASIC/CPU module, a communication bus for communicating with the processing system 102, and a transmitter and receiver (or may be implemented as a transceiver) for two-way communication with the RFID reader 118. In response to receipt of an interrogation signal, the ASIC/CPU module of the RFID tag 112 formulates a response that may include data from the RFID tag, and the response is wirelessly transmitted to the RFID reader 118. The response signals from a RFID tag can be communicated using low frequency (LF), high frequency (HF), or ultrahigh frequency (UHF) radio waves. The RFID tag data can be stored in non-volatile memory, and the ASIC/CPU module can be implemented as fixed or programmable logic for processing the RFID tag data, as well as modulating and demodulating the RF signals.

In this example, the processing system 102 includes an operating system 122 of the mobile device 100, and a power manager 124 to implement embodiments of RFID-based power status and battery management. The power manager 124 can be implemented as a software application or module, such as computer-executable software instructions that are executable with a processor (e.g., with the processing system 102). As software applications, the operating system 122 and the power manager 124 can be stored on computer-readable storage memory (e.g., the device memory 104), such as any suitable memory device or electronic data storage implemented in the mobile device. Further, although shown and described as separate components, the power manager 124 may be implemented as a module or component of the operating system 122. In implementations, the processing system 102, to include the operating system 122 and/or the power manager 124, can communicate with the RFID tag 112 via a communication bus 126 that is implemented in the mobile device 100.

In embodiments of RFID-based power status and battery management, the RFID tag memory 114 (e.g., non-volatile memory) can be accessed by the RFID reader 118 via a radio frequency (RF) interface 128 of the RFID tag 112, or can be accessed via a bus interface 130 that connects the communication bus 126 to the RFID tag. The processing system 102 can communicate with the RFID tag 112 via the communication bus 126 and the bus interface 130 when the mobile device 100 is powered-on. For example, an antenna of the RFID tag 112 can be enabled or disabled via a command sent from the power manager 124 of the processing system 102 via the communication bus 126 and the bus interface 130. In embodiments, the power manager 124 of the processing system 102 communicates with the RFID tag 112 to initiate the RFID tag enabling the antenna when the mobile device 100 is powered-down, and to initiate the RFID tag 112 disabling the antenna when the mobile device is powered-up. Accordingly, the RFID reader 118 can then determine that the mobile device 100 is powered on based on the RFID tag 112 not responding to the interrogation from the RFID reader, or determine that the mobile device is powered off based on the RFID tag responding to the interrogation from the RFID reader.

A battery level indication 132 of the mobile device 100 can be periodically saved into the RFID tag memory 114 of the RFID tag 112 by a command sent from the power manager 124 of the processing system 102 via the communication bus 126 while the mobile device is powered on. The battery level indication 132 is maintained in the RFID tag memory 114 even when the mobile device is powered off, and is an indication of the battery level of the battery 108 in the mobile device 100. Additionally, a stowed context of the mobile device 100 can be determined by the power manager 124 based on one or more sensors 134 implemented in the mobile device while the device is powered on. For example, the mobile device 100 may be stowed in packaging and a box for shipping and retail sale, or stowed in a suitcase, a bag, a pocket of a user of the device, etc. The sensors 134 of the mobile device 100 may include any one or more of an ambient light sensor, a proximity sensor, a touch sensor, an infrared (IR) sensor, and the like from which a stowed context of the device can be determined. A stowed context indication 136 of the mobile device can then be stored and maintained in the RFID tag memory 114 of the RFID tag 112 to indicate whether the mobile device is stowed or not stowed.

In this example, an output signal line 138 is connected to the power switch 110 of the mobile device 100, and the power switch can be turned on and off via an output signal from the RFID tag 112, via the bus interface 130 and the communication bus 126 to the power manager 124. As noted above, a device can be inadvertently powered-up (e.g., turned on) while being packaged for shipping and retail sale, which then drains the battery during transit and before a consumer purchases the device. In embodiments, the mobile device 100 can be wirelessly powered-up (e.g., turned-on) or powered-down (e.g., turned off) by a command sent from the external RFID reader 118 to the RFID tag 112, which then communicates the command to the power manager 124 that toggles the output signal line 138 connected to the power switch 110. In an event that the mobile device 100 has been stowed, but inadvertently powered on, the device can then be powered-down remotely while still in the packaging.

Additionally, a power-state indicator 140 of the mobile device 100 can be periodically saved into the RFID tag memory 114 of the RFID tag 112 by a command sent from the power manager 124 of the processing system 102 via the communication bus 126 while the mobile device is powered on. The power-state indicator 140 is an indication of whether the mobile device 100 is currently powered on or powered off. In implementations, the power-state indicator 140 can be a status bit set by the power manager 124 to a binary value of one (1) indicating that the mobile device 100 is powered on, or set to a binary value of zero (0) indicating that the mobile device 100 is powered off. Further, a powered-off timestamp 142 can be maintained in the RFID tag memory 114 of the RFID tag 112 to indicate a time when the mobile device 100 was last powered-down and when the power-state indicator 140 is set to indicate that the mobile device 100 is powered off.

In embodiments, the antenna of the RFID tag 112 is always enabled regardless of whether the mobile device 100 is powered on or powered off. The RFID reader 118 can then determine whether the mobile device 100 is powered on or powered off by reading the power-state indicator 140. For example, the RFID reader 118 can interrogate the RFID tag 112 and in response, receive the power-state indicator 140 as a binary value of one (1) indicating that the mobile device 100 is powered on, or as a binary value of zero (0) indicating that the mobile device 100 is powered off. If the power-state indicator 140 received from the RFID tag 112 (e.g., as the RFID tag information 120 at the RFID reader 118) indicates that the mobile device is powered on, then the RFID reader 118 can further read the battery level indication 132 and the stowed context indication 136 from the RFID tag 112.

If a determination is made that the mobile device 100 is both powered on and stowed based on the respective indicators, and the battery level of the battery 108 in the mobile device is at least at a designated level or higher, then the RFID reader 118 can initiate a command to the RFID tag 112, which then communicates the command to the power manager 124 that toggles the output signal line 138 connected to the power switch 110 to remotely power-down (e.g., turn-off) the device while stowed and still in the packaging. Further, if a determination is made that the battery level of the battery 108 in the mobile device is below the designated level, then measures can be taken to re-charge the battery, such as by the packaging being opened and wire-charging the battery, or by in-box wireless charging.

Example methods 200, 300, and 400 are described with reference to respective FIGS. 2-4 in accordance with implementations of RFID-based power status and battery management. Generally, any services, components, modules, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 2:
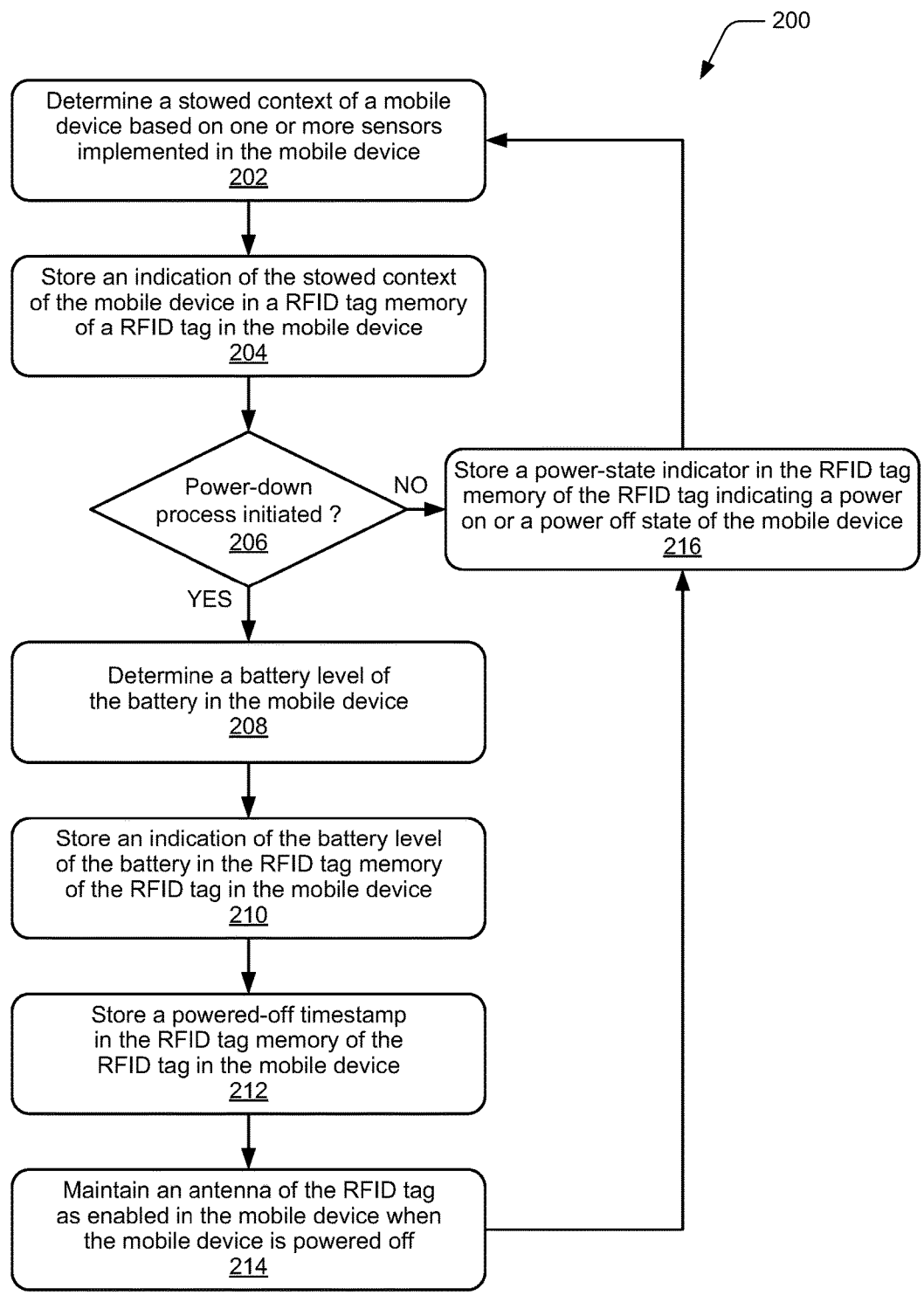
FIG. 2 illustrates example method(s) of RFID-based power status and battery management in accordance with one or more embodiments.

FIG. 2 illustrates example method(s) 200 of RFID-based power status and battery management as described herein, and is generally described with reference to the power manager 124 that is implemented in the mobile device 100. The order in which the method is described is not intended to be construed as a limitation, and any number or combination of the described method operations can be performed in any order to perform a method, or an alternate method.

At 202, a stowed context of a mobile device is determined based on one or more sensors implemented in the mobile device. For example, the power manager 124 of the processing system 102 in the mobile device 100 determines a stowed context of the device based on one or more sensors 134 implemented in the mobile device while the device is powered on. The mobile device 100 may be stowed in packaging and a box for shipping and retail sale, or stowed in a suitcase, a bag, a pocket of a user of the device, etc. The sensors 134 of the mobile device 100 may include any one or more of an ambient light sensor, a proximity sensor, a touch sensor, an infrared (IR) sensor, and the like from which the stowed context of the device can be determined.

At 204, an indication of the stowed context is stored in the RFID tag memory of the RFID tag in the mobile device. For example, the power manager 124 of the processing system 102 in the mobile device 100 stores the stowed context indication 136 of the mobile device in the RFID tag memory 114 of the RFID tag 112 to indicate whether the mobile device is stowed or not stowed. At 206, a determination is made as to whether a power-down process of the mobile device has been initiated. For example, a user may initiate powering-down the mobile device 100 by activation of an external power switch, or the mobile device may be powered-down by toggling the internal power switch 110 to turn the device off.

If a power-down process of the mobile device has been initiated (i.e., "Yes" from 206), then at 208, a battery level of the battery in the mobile device is determined and, at 210, an indication of the battery level of the battery in the mobile device is stored in the RFID tag memory of the RFID tag. For example, the power manager 124 of the processing system 102 in the mobile device 100 determines the battery level of the battery 108 in the mobile device, and the battery level indication 132 of the mobile device is stored in the RFID tag memory 114 of the RFID tag 112 by a command sent from the power manager 124 of the processing system 102 via the communication bus 126 to the RFID tag 112.

Additionally, at 212, a powered-off timestamp is stored in the RFID tag memory of the RFID tag. For example, powered-off timestamp 142 is stored and maintained in the RFID tag memory 114 of the RFID tag 112 to indicate a time when the mobile device 100 was last powered-down. At 214, an antenna of the RFID tag in the mobile device is maintained as enabled before the mobile device is powered off. For example, the power manager 124 of the processing system 102 in the mobile device 100 maintains the antenna of the RFID tag 112 being enabled in the mobile device 100 when the mobile device is powered-down.

Continuing from 214, or if a power-down process of the mobile device has not been initiated (i.e., "No" from 206), then at 216, a power-state indicator is stored in the RFID tag memory of the RFID tag to indicate a power on state or a power off state of the mobile device. For example, the power manager 124 of the processing system 102 in the mobile device 100 can periodically save the power-state indicator 140 to the RFID tag memory 114 of the RFID tag 112 via the communication bus 126 and the bus interface 130. The power-state indicator 140 is an indication of whether the mobile device 100 is currently powered on or powered off. In implementations, the power-state indicator 140 can be a status bit set by the power manager 124 to a binary value of one (1) indicating that the mobile device 100 is powered on, or set to a binary value of zero (0) indicating that the mobile device 100 is powered off.

Figure 3:
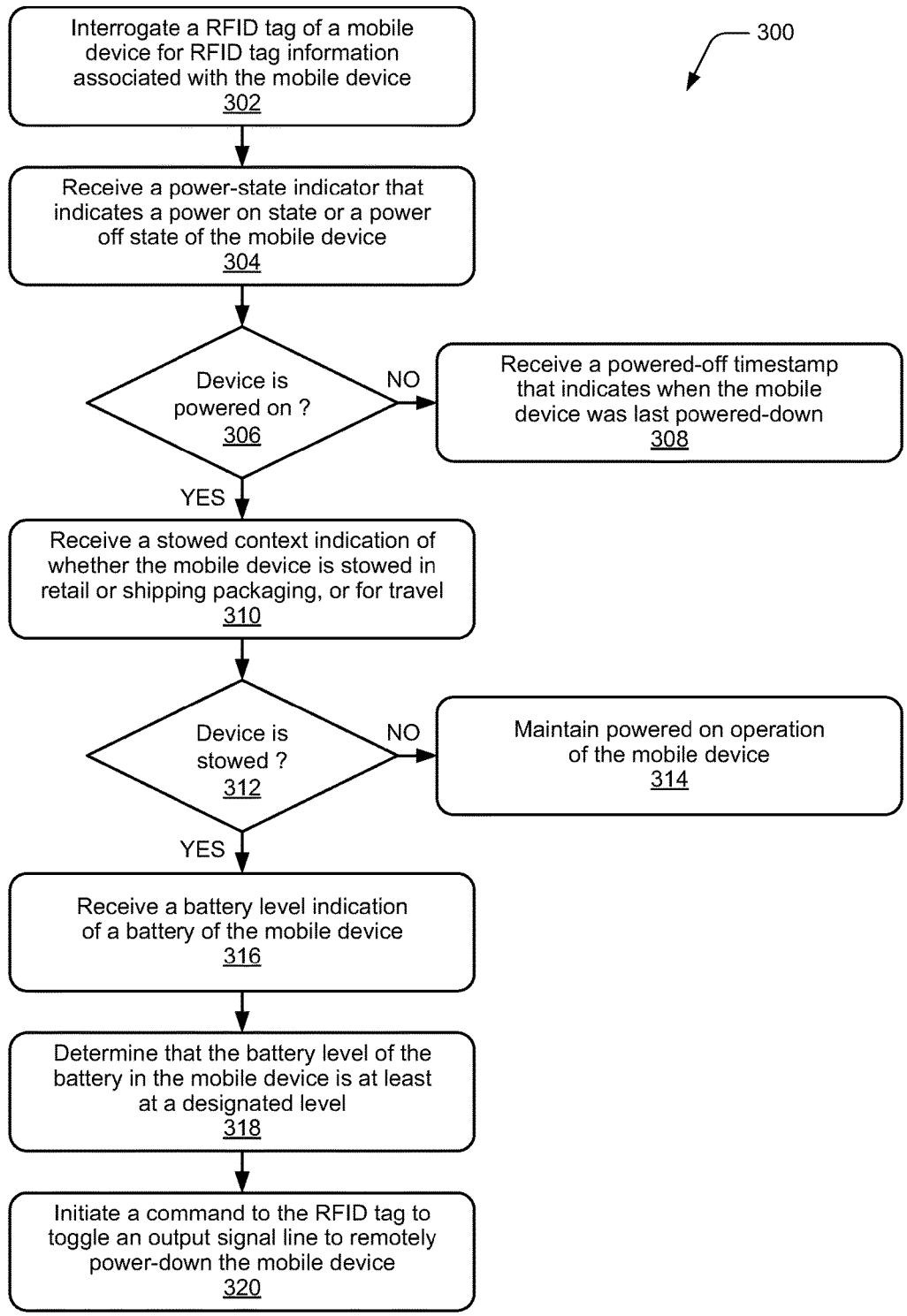
FIG. 3 illustrates example method(s) of RFID-based power status and battery management in accordance with one or more embodiments.

FIG. 3 illustrates example method(s) 300 of RFID-based power status and battery management, and is generally described with reference to the RFID reader 118 and the RFID tag 112 implemented in the mobile device 100. The order in which the method is described is not intended to be construed as a limitation, and any number or combination of the described method operations can be performed in any order to perform a method, or an alternate method.

At 302, a radio-frequency identification (RFID) tag of a mobile device is interrogated for RFID tag information associated with the mobile device. For example, the RFID reader 118 interrogates the RFID tag 112 for the RFID tag information 120 that is associated with the mobile device 100, such as the battery level indication 132 that is maintained in the RFID tag memory 114 as an indication of the battery level of the battery 108 in the mobile device 100; the stowed context indication 136 that is maintained in the RFID tag memory 114 as an indication as to whether the mobile device 100 is stowed or not stowed (e.g., in packaging and a box for shipping and retail sale, or in a user's luggage or bag); the power-state indicator 140 as an indication of whether the mobile device 100 is currently powered on or powered off; and the powered-off timestamp 142 that indicates a time when the mobile device 100 was last powered-down.

At 304, the power-state indicator that indicates the power on state or the power off state of the mobile device is received and, at 306, a determination is made as to whether the mobile device is powered on based on the power-state indicator. For example, the RFID reader 118 receives the power-state indicator 140 that indicates whether the mobile device 100 is currently powered on or powered off, and a determination is made as to whether the mobile device is powered on based on the power-state indicator. If the device is not powered on (i.e., "No" from 306), then at 308, the RFID reader 118 receives an interrogation response of the powered-off timestamp that indicates when the mobile device was last powered down. For example, the RFID reader 118 receives the powered-off timestamp 142 that indicates a time when the mobile device 100 was last powered-down, and the RFID reader 118 receives the powered-off timestamp either in response to the RFID tag interrogation at 302, or in response to an additional RFID tag interrogation.

If the device is powered on (i.e., "Yes" from 306), then at 310, an interrogation response of the stowed context indication is received from the RFID tag. For example, the RFID reader 118 receives the stowed context indication 136 that is maintained in the RFID tag memory 114 as an indication as to whether the mobile device 100 is stowed or not stowed, such as in retail or shipping packaging, or for travel. The RFID reader 118 receives the stowed context indication 136 either in response to the RFID tag interrogation at 302, or in response to an additional RFID tag interrogation.

At 312, a determination is made as to whether the mobile device is stowed in packaging or for travel based on the stowed context indication. For example, the RFID reader 118 determines whether the mobile device is stowed based on the stowed context indication 136, and if the mobile device is not stowed (i.e., "No" from 312), then at 314, powered operation of the mobile device is maintained. However, if the mobile device is determined to be stowed (i.e., "Yes" from 312), then at 316, an interrogation response of the battery level indication of the battery in the mobile device is received from the RFID tag. For example, the RFID reader 118 receives the battery level indication 132 of the battery 108 in the mobile device 100, and The RFID reader 118 receives the battery level indication 132 either in response to the RFID tag interrogation at 302, or in response to an additional RFID tag interrogation.

At 318, a determination is made as to whether the battery level of the battery in the mobile device is at least at a designated level based on the battery level indication. For example, a determination as to whether the battery level of the battery 108 in the mobile device 100 is at least at a designated level based on the battery level indication 132 received as part of the RFID tag information 120 received by the RFID reader 118 from the RFID tag 112. At 320, a power-down command is initiated to the RFID tag to toggle an output signal line that is connected to a power switch of the mobile device to remotely power-down the mobile device. For example, the RFID reader 118 initiates the command by transmitting the power-down command to the RFID tag 112 that then communicates the command to the power manager 124 via the bus interface 130 and the communication bus 126, and the power manager 124 toggles the output signal line 138 connected to the power switch 110 in the mobile device 100 to power-down the mobile device. If the determination is made that the mobile device 100 is both powered on and stowed based on the respective indicators, and the battery level of the battery 108 in the mobile device is at least at a designated level or higher, then the RFID reader 118 can initiate the command to the RFID tag 112 to remotely power-down (e.g., turn-off) the device while stowed and still in the packaging, or while the device is packed in luggage or a bag for travel.

Figure 4:
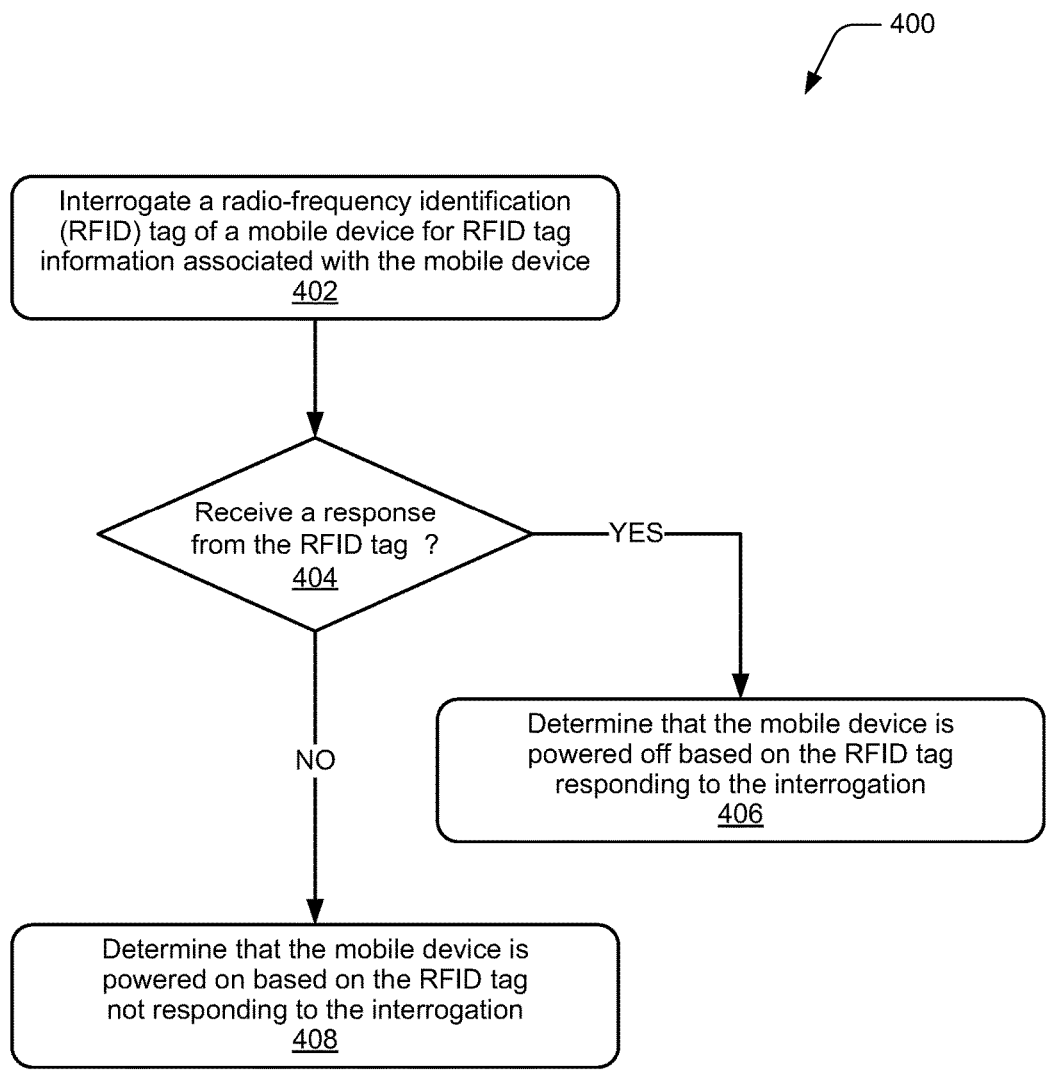
FIG. 4 illustrates example method(s) of RFID-based power status and battery management in accordance with one or more embodiments.

FIG. 4 illustrates example method(s) 400 of RFID-based power status and battery management, and is generally described with reference to the RFID reader 118 and the RFID tag 112 implemented in the mobile device 100. The order in which the method is described is not intended to be construed as a limitation, and any number or combination of the described method operations can be performed in any order to perform a method, or an alternate method.

At 402, a radio-frequency identification (RFID) tag of a mobile device is interrogated for RFID tag information associated with the mobile device. For example, the RFID reader 118 interrogates the RFID tag 112 for the RFID tag information 120 that is associated with the mobile device 100. At 404, a determination is made as to whether a response to the interrogation is received from the RFID tag. For example, the RFID reader 118 may or may not receive an interrogation response from the RFID tag 112 in the mobile device 100.

If a response to the interrogation is received from the RFID tag (i.e., "Yes" from 404), then at 406, it is determined that the mobile device is powered off based on the RFID tag responding to the interrogation. For example, the power manager 124 of the processing system 102 in the mobile device 100 enables the antenna of the RFID tag 112 in the mobile device 100 when the mobile device is powered-down, and if the RFID tag 112 responds to the RFID reader interrogation, then the mobile device is determined to be powered off. If a response to the interrogation is not received from the RFID tag (i.e., "No" from 404), then at 408, it is determined that the mobile device is powered on based on the RFID tag not responding to the interrogation. For example, the power manager 124 of the processing system 102 in the mobile device 100 disables the antenna of the RFID tag 112 in the mobile device 100 when the mobile device is powered-up, and if the RFID tag 112 does not respond to the RFID reader interrogation, then the mobile device is determined to be powered on.

Figure 5:
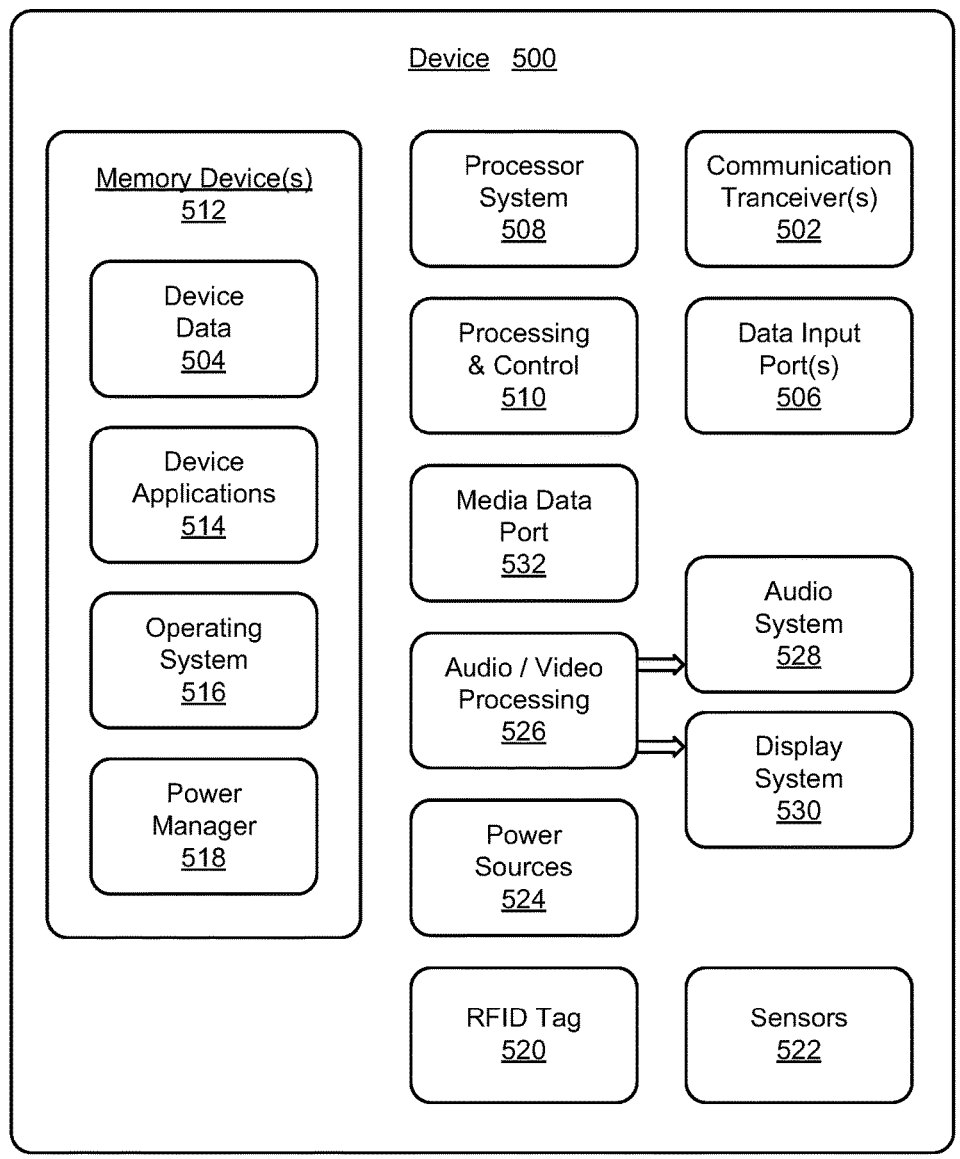
FIG. 5 illustrates various components of an example device that can implement embodiments of RFID-based power status and battery management.

FIG. 5 illustrates various components of an example device 500 in which embodiments of RFID-based power status and battery management can be implemented. The example device 500 can be implemented as any of the computing devices described with reference to the previous FIGS. 1-4, such as any type of client device, mobile phone, tablet, computing, communication, entertainment, gaming, media playback, and/or other type of device. For example, the mobile device 100 shown in FIG. 1 may be implemented as the example device 500.

The device 500 includes communication transceivers 502 that enable wired and/or wireless communication of device data 504 with other devices, such as the battery level indication 132, the stowed context indication 136, the power-state indicator 140, and the powered-off timestamp 142 as described with reference to the mobile device 100 shown in FIG. 1. Additionally, the device data can include any type of audio, video, and/or image data. Example transceivers include wireless personal area network (WPAN) radios compliant with various IEEE 802.15 (Bluetooth™) standards, wireless local area network (WLAN) radios compliant with any of the various IEEE 802.11 (WiFi™) standards, wireless wide area network (WWAN) radios for cellular phone communication, wireless metropolitan area network (WMAN) radios compliant with various IEEE 802.15 (WiMAX™) standards, and wired local area network (LAN) Ethernet transceivers for network data communication.

The device 500 may also include one or more data input ports 506 via which any type of data, media content, and/or inputs can be received, such as user-selectable inputs to the device, messages, music, television content, recorded content, and any other type of audio, video, and/or image data received from any content and/or data source. The data input ports may include USB ports, coaxial cable ports, and other serial or parallel connectors (including internal connectors) for flash memory, DVDs, CDs, and the like. These data input ports may be used to couple the device to any type of components, peripherals, or accessories such as microphones and/or cameras.

The device 500 includes a processing system 508 of one or more processors (e.g., any of microprocessors, controllers, and the like) and/or a processor and memory system implemented as a system-on-chip (SoC) that processes computer-executable instructions. The processor system may be implemented at least partially in hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively or in addition, the device can be implemented with any one or combination of software, hardware, firmware, or fixed logic circuitry that is implemented in connection with processing and control circuits, which are generally identified at 510. The device 500 may further include any type of a system bus or other data and command transfer system that couples the various components within the device. A system bus can include any one or combination of different bus structures and architectures, as well as control and data lines.

The device 500 also includes computer-readable storage memory 512 that enable data storage, such as data storage devices that can be accessed by a computing device, and that provide persistent storage of data and executable instructions (e.g., software applications, programs, functions, and the like). Examples of the computer-readable storage memory 512 include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage media in various memory device configurations. The device 500 may also include a mass storage media device.

The computer-readable storage memory 512 provides data storage mechanisms to store the device data 504, other types of information and/or data, and various device applications 514 (e.g., software applications). For example, an operating system 516 can be maintained as software instructions with a memory device and executed by the processing system 508. The device applications may also include a device manager, such as any form of a control application, software application, signal-processing and control module, code that is native to a particular device, a hardware abstraction layer for a particular device, and so on. In this example, the device 500 includes a power manager 518 that implements embodiments of RFID-based power status and battery management, and may be implemented with hardware components and/or in software, such as when the device 500 is implemented as the mobile device 100 described with reference to FIGS. 1-4. An example of the power manager 518 is the power manager 124 that is implemented as an application in the mobile device 100.

The device 500 also includes a radio-frequency identification (RFID) tag 520, such as described with reference to the RFID tag 112 implemented in the mobile device 100. The device 500 also includes one or more device sensors 522, such as described with reference to the sensors 134 implemented in the mobile device 100. As noted, the device sensors 522 may include any one or more of an ambient light sensor, a proximity sensor, a touch sensor, an infrared (IR) sensor, and the like. The device 500 can also include one or more power sources 524, such as when the device is implemented as a mobile device. The power sources may include a charging and/or power system, and can be implemented as a flexible strip battery, a rechargeable battery, a charged super-capacitor, and/or any other type of active or passive power source.

The device 500 also includes an audio and/or video processing system 526 that generates audio data for an audio system 528 and/or generates display data for a display system 530. The audio system and/or the display system may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 532. In implementations, the audio system and/or the display system are integrated components of the example device. Alternatively, the audio system and/or the display system are external, peripheral components to the example device.

Although embodiments of RFID-based power status and battery management have been described in language specific to features and/or methods, the subject of the appended claims is not necessarily limited to the specific features or methods described. Rather, the specific features and methods are disclosed as example implementations of RFID-based power status and battery management, and other equivalent features and methods are intended to be within the scope of the appended claims. Further, various different embodiments are described and it is to be appreciated that each described embodiment can be implemented independently or in connection with one or more other described embodiments.

The invention claimed is:

1. A method comprising:
   interrogating a radio-frequency identification (RFID) tag of a mobile device from a RFID reader;
   determining that the mobile device is powered on based on the RFID tag not responding to the interrogation from the RFID reader, an antenna of the RFID tag being disabled when the mobile device is powered-up;
   determining that the mobile device is powered off based on the RFID tag responding to the interrogation from the RFID reader, the antenna of the RFID tag being enabled when the mobile device is powered-down;
   determining a battery level of a battery in the mobile device while the mobile device is said powered-down; and
   storing an indication of the battery level in a memory of the RFID tag while the mobile device is said powered-down.

2. The method as recited in claim 1, further comprising:
   storing a power-state indicator in a memory of the RFID tag while the mobile device is said powered-down, the power-state indicator indicating a power off state of the mobile device.

3. The method as recited in claim 1, further comprising:
   determining a stowed context of the mobile device based on one or more sensors implemented in the mobile device, said determining the stowed context while the mobile device is powered on; and
   storing an indication of the stowed context in a memory of the RFID tag indicating whether the mobile device is stowed or not stowed.

4. The method as recited in claim 3, further comprising:
   initiating a command to the RFID tag to power-down the mobile device based on said determining that the mobile device is powered on and is stowed.

5. A mobile device, comprising:
   a radio-frequency identification (RFID) tag that includes a memory to maintain context information associated with the mobile device;
   a processing system to execute a power manager and to interface with the RFID tag via a communication bus, the power manager implemented to:
   determine a stowed context of the mobile device based on one or more sensors implemented in the mobile device;
   communicate a stowed context indication of the stowed context of the mobile device to the RFID tag to be stored in the RFID tag memory; and
   communicate a power-state indicator of a power on state or a power off state of the mobile device to the RFID tag to be stored in the RFID tag memory.

6. The mobile device as recited in claim 5, wherein the power manager is implemented to:
   detect that a power-down process of the mobile device has been initiated; and
   said communicate the power-state indicator of the power off state of the mobile device to the RFID tag to be stored in the RFID tag memory.

7. The mobile device as recited in claim 6, wherein the power manager is implemented to:
   communicate a powered-off timestamp to the RFID tag to be stored in the RFID tag memory, the powered-off timestamp indicating when the mobile device was powered off.

8. The mobile device as recited in claim 6, wherein the power manager is implemented to maintain an antenna of the RFID tag enabled after the mobile device is said powered-down and after the mobile device is powered off.

9. The mobile device as recited in claim 5, wherein the power manager is implemented to:
   determine a battery level of a battery that powers the mobile device; and
   communicate a battery level indication to the RFID tag to be stored in the RFID tag memory.

10. The mobile device as recited in claim 5, wherein:
    the power manager comprises an output signal line connected to a power switch of the mobile device; and
    the RFID tag is configured to receive a command from a RFID reader to toggle the output signal line to power-down the mobile device, and communicate the command to the power manager via the communication bus to initiate the power manager toggling the output signal line.

11. The mobile device as recited in claim 10, wherein the RFID tag is configured to receive the command to toggle the output signal line from the RFID reader to power-down the mobile device based on a determination that the mobile device is stowed and powered on.

12. The mobile device as recited in claim 10, wherein the RFID tag is configured to receive the command to toggle the output signal line from the RFID reader to power-down the mobile device based on a determination that the mobile device is stowed, powered on, and a battery level of a battery that powers the mobile device is at least at a designated level.

13. The mobile device as recited in claim 5, wherein the power manager is implemented to:
    detect that a power-up process of the mobile device has been initiated; and said communicate the power-state indicator of the power on state of the mobile device to the RFID tag to be stored in the RFID tag memory.

14. A method, comprising:

interrogating a radio-frequency identification (RFID) tag of a mobile device from a RFID reader for context information associated with the mobile device;

receiving a power state indicator that indicates a power on state of the mobile device or a power off state of the mobile device, the power state indicator maintained in a RFID tag memory of the RFID tag;

determining whether the mobile device is powered on or powered off based on the power state indicator; and receiving a stowed context indication of whether the mobile device is stowed or not stowed for shipping, the stowed context indication maintained in the RFID tag memory of the RFID tag.

15. The method as recited in claim 14, further comprising:

determining that the mobile device is powered on based on the power state indicator and that the mobile device is not stowed based on the stowed context indication; and maintaining the power on state and operation of the mobile device based on said determining that the mobile device is powered on and not stowed.

16. The method as recited in claim 14, further comprising: determining that the mobile device is powered on based on the power state indicator and that the mobile device is stowed for shipping based on the stowed context indication.

17. The method as recited in claim 16, further comprising: initiating a command to the RFID tag to power-down the mobile device based on said determining that the mobile device is powered on and stowed for shipping.

18. The method as recited in claim 16, further comprising: receiving a battery level indication of a battery level of a battery that powers the mobile device, the battery level indication maintained in the RFID tag memory of the RFID tag.

19. The method as recited in claim 18, further comprising: determining that the battery level of the battery in the mobile device is at least at a designated level; and initiating a command to the RFID tag to power-down the mobile device based on said determining that the mobile device is powered on, stowed for shipping, and the battery level of the battery is at least at the designated level.

20. The method as recited in claim 18, further comprising: determining that the battery level of the battery in the mobile device is below a designated level; and indicating that the battery in the mobile device needs to be charged.

* * * * *